United States Patent Office 3,467,497
Patented Sept. 16, 1969

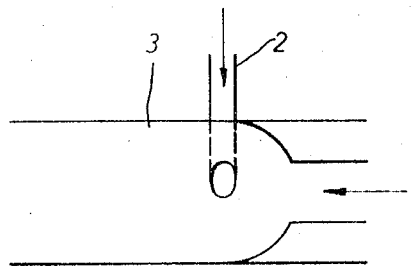
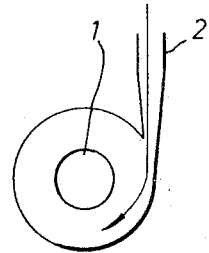
FIG. 1      FIG. 2
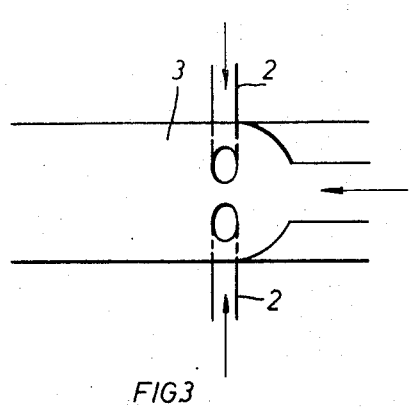
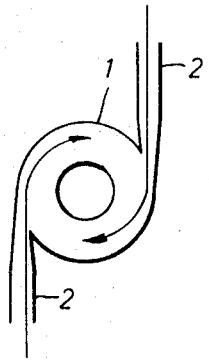
FIG. 3      FIG. 4
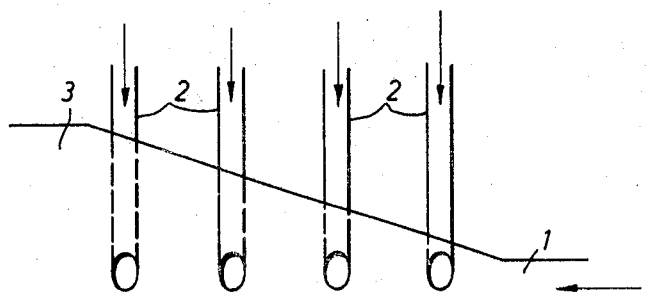
FIG. 5
ROLAND WEISBECK
HANS-GEORG FITZKY
WALTER SIMM
GERHART HEYL    INVENTORS

3,467,497
PROCESS FOR THE PREPARATION OF ZINC OXIDE OF HIGH PHOTOSENSITIVITY
Roland Weisbeck, Cologne-Poll, Hans-Georg Fitzky, Cologne-Stammheim, Walter Simm, Opladen, and Gerhard Heyl, Cologne-Stammheim, Germany, assignors to Agfa-Gevaert Aktiengesellschaft, Leverkusen, Germany, a corporation of Germany
Filed Jan. 12, 1966, Ser. No. 520,288
Claims priority, application Germany, Jan. 21, 1965, A 48,187
Int. Cl. C01g 9/02
U.S. Cl. 23—148                                    4 Claims

ABSTRACT OF THE DISCLOSURE

Zinc oxide of high photosensitivity is prepared by burning zinc vapor, carried by a reducing gas, in a combustion zone surrounded by tangentially introduced air or oxygen.

---

Zinc oxide can be prepared by known wet chemical or pyrogenic processes. In pyrogenic processes, a distinction is made between the so-called "American or direct process" starting from zinc ores or their roasted products, metallurgical by-products or ashes, and the so-called "French or indirect process" in which metallic zinc is vaporized and the vapor is burnt. It is known that only the zinc oxides prepared by the French process are to any extent satisfactory in their photosensitivity, e.g., their photoconductivity.

The known French processes differ from each other in the type of muffles, the construction of the furnaces, the choice of raw material, the type and form of heating and the construction of the oxidation chambers and receivers. In the chamber for the deposition of zinc oxide vapor, fractionation according to particle size and to some extent according to purity takes place such that the coarsest fraction is deposited nearest to the combustion chamber. In many cases, the finest fraction is of higher purity than the coarsest fraction.

It is also known that the purity and fineness of zinc oxide can be improved by subjecting the zinc oxide vapor withdrawn from the combustion chambers to an aftertreatment which may consist, for example, in storing the zinc oxide vapor after it leaves the combustion chambers, in chambers equipped with throttled hoods and maintained at annealing temperatures of about 500 to 800° C. before it enters the actual precipitation chambers.

Although the processes hitherto known by which zinc oxide is prepared by the combustion of metallic zinc yield zinc oxide of good quality for use in paints and related products, rubber products, in the manufacture of glass, enamel and ceramics and in the pharmaceutical industry, these processes are unsuitable in their present form for obtaining zinc oxide of high photosensitivity such as is required, for example, for the production of photoconductive layers for use in electrophotography.

The photoconductive layer of electrophotographic materials consists of a photoconductor, which is predominantly zinc oxide, dispersed in a suitable insulating binding agent. Zinc oxide suitable for this purpose must have only a very low conductivity in the dark and must have the property of adsorbing a large quantity of oxygen on the surface of the grain. In addition, the conductivity of the zinc oxide must increase even with only weak exposure. Moreover, the oxygen adsorption layer on the grain surface must be capable of rapid desorption and this desorption must take place to a large extent even in response to only weak exposure.

From the physics of semi-conductivity it is known that zinc oxide is a reduction semiconductor and always has a more or less large deficiency of oxygen in the crystal lattice and that the speed of response of the zinc oxide to incident light depends to a large extent on the disorder of the lattice. A zinc oxide suitable for electrophotography must be as far as possible stoichiometric and pure and should at the most have a lattice which is only slightly disturbed due to intrinsic disorder of structure. The requirement of purity is not so important if the other requirements can be more completely fulfilled by slight doping at the lattice sites.

The known methods based on the French process are unable to yield a zinc oxide product, or at least are unable to do so in a reproducible manner which could even remotely fulfil the abovementioned stringent requirements which must nowadays be placed on zinc oxide for use in obtaining rapid production of high quality electrophotographic images with the use of inexpensive sources of light of only low intensity combined with brief exposure times.

The object of the present invention is to develop a process for the preparation of zinc oxide of high photosensitivity by the combustion of zinc vapor and thermal aftertreatment of the zinc oxide fumes.

It has now been found that a zinc oxide having excellent photoconductive properties is obtained by vaporizing zinc and transporting it together with reducing gases along the longitudinal axis of a substantially axially symmetrical combustion chamber while blowing a stoichiometrical excess of oxygen or air tangentially into this chamber at one or more points so that a strongly turbulent flame is produced which does not touch the walls.

According to a preferred embodiment, the oxygen or air is blown in tangentially at one or more points approximately perpendicularly to the axis of the axially symmetrical combustion chamber so that the oxygen or air runs along vortex paths.

The special advantages of the process according to the invention consist in that a zinc oxide of satisfactory stoichiometric composition and low dark conductivity and very high photoconductivity with brief increase period of the photoelectric current can be prepared in a reproducible manner. In addition, it is very advantageous that with the combustion plant provided it is possible to control the average particle size of the zinc oxide within a region of about 0.1 to 1.0 $\mu$m. (micron) simply by varying the volumetric ratio of oxygen and the reducing gas which is preferably hydrogen.

To obtain zinc oxide by the process according to the invention it is preferred to vaporize pure zinc at temperatures between about 700 and 1100° C. from vessels having a relatively large surface. The material from which the vessels are made must neither contaminate the zinc nor be attacked by zinc.

Suitable materials are, e.g., quartz and aluminium oxide ceramic. Heating may be carried out by known methods. The zinc vapor is transported together with a reducing gas or gas mixture from the point where it is evaporated, of the axis of rotation. Suitable gases are hydrogen, carbon monoxide, mixtures of these two gases e.g., water gas, and mixtures of the two gases with inert gases or into the symmetrical combustion chamber in the direction other combustible gases such as illuminating gas but in all cases the mixture must contain a reducing gas. The function of the gas is to prevent oxidation of the zinc melt which would cause blocking of the vaporization of the zinc, to transport the zinc vapor into the combustion chamber, to keep the inlet of the combustion chamber and the combustion chamber itself free from accretions of zinc oxide and partially oxidized zinc and to act as a constant source of high temperature and as stabilizer for the combustion of the zinc vapor. To prevent the formation of zinc condensate in the inlet aperture of the combustion chamber, the temperature of the inlet aperture must be about 100 to 300° C. higher than that of the vessel for the evaporation of the zinc. It has been found that the volume of hydrogen and/or carbon monoxide used per kilogram of vaporized zinc should be preferably between 0.2 and 2 Nm.³ (cubic meters at 0° C. and 760 mm.).

During combustion of the zinc vapor, the zinc oxide may be doped by vaporizing the doping agent either together with the zinc or preferably in a separate place and transporting it together with the reducing gas into the combustion chamber. From the point of view of photoconductivity, it is advantageous to dope with 0.01 to a maximum of 1% by weight of lithium. This can be achieved e.g., by vaporizing metallic lithium at temperatures about 250 to 20° C. below the vaporization temperature of zinc.

Various arrangements of the combustion chamber suitable for carrying out the process according to the invention are shown schematically in FIGURES 1 to 5. In FIGURES 1, 3 and 5 are illustrated different embodiments of the combustion chamber. FIGURES 2 and 4 are sectional drawings of the combustion chambers shown in FIGURES 1 and 3. In all the figures, zinc vapor and reducing gas flow axially at 1 and oxygen or air flow tangentially at 2 into the combustion chamber 3 which is not heated externally. It has been found that to produce zinc oxide according to the invention, the volume of oxygen blown onto the vortex paths must be at least twice the volume of the reducing gas and at least twice the volume required for the stoichiometric combustion of the reducing gas and of the zinc vapor. Near the injection aperture, the currents of oxygen or air flow directly along the inner wall of the combustion chamber due to the centrifugal force. But even here a small portion of the oxygen leaves the vortex to reach the boundary of the axial zone along which flows the mixture of zinc vapor and reducing gas. Turbulence and hence mixing of all the components and ignition take place at the boundary zone. The eddy of oxygen or air vortex constricts the flame and prevents it from touching the walls of the combustion chamber and prevents the product of combustion from reaching the walls. The further the vortex is removed from the injection aperture, the more it will decompose due to friction losses and become detached from the wall of the combustion chamber, as a result of which strong turbulence is produced over the whole cross-section of the combustion chamber. This strong turbulence leads to almost ideal mixing of all the gases and vapors present, especially in the axial zone, and to complete combustion of the zinc vapor so that an accurately stoichiometric zinc oxide is produced.

The combustion temperature should lie between 1500 and 2000° C. Generally, a platinum wire held in the flame will melt, i.e., the flame temperature will be higher than 1773° C. A temperature higher than about 2000° C. cannot occur since the oxyhydrogen flame has a temperature of about 2000° C. and the temperature of metal flame is limited upwardly by the expenditure of energy for the decomposition of the oxide which in the case of zinc oxide starts vigorously about 2000° C. Zinc vapor burns with a greenish flame. It has been found that combustion of hydrogen and/or carbon monoxide takes place predominantly in the front part and combustion of the zinc vapor predominantly in the rear part of the combustion chamber.

The geometric dimensions of a combustion chamber for carrying out the process according to the invention are not very critical. To obtain combustion speeds of, e.g., 1 kg. of zinc per hour, the volume of the combustion chamber should be about 100 cc. At a given volume of combustion chamber, an increase in the rate of zinc combustion can be more easily achieved in arrangements having several tangential injectors for oxygen or air, e.g., as shown in FIGURES 3 to 5, than in an arrangement having only one injector as in FIGURES 1 and 2. Where a plurality of injectors is used, these need not always be arranged in one plane or parallel to each other as shown in FIGURE 5 but may advantageously also be staggered, e.g., through 180° C. as indicated in FIGURES 3 and 4.

Suitable materials for the combustion chamber are quartz glass owing to its transparency, quartz ware and ceramic materials such as those based on silicic acid clay. Metals and metal alloys of high melting point which are difficult to oxidize may also be used. For reasons of cost and convenience of manufacture, the most suitable materials are metal alloys, especially the temperature-resistant and non-scaling austenitic steels alloyed with chromium, nickel and silicon. Since the flame does not make contact with the walls of the combustion chamber, a temperature-resistance to about 1000 to 1200° C. is sufficient for the material of the walls.

The zinc oxide fume produced leaves the combustion chamber to enter the directly adjacent after-treatment chamber which is substantially larger than the combustion chamber and is at a temperature of between 500 and 900° C. The geometrical dimensions of the two chambers differ from each other approximately by one order of magnitude. The after-treatment chamber contains several baffle walls which increase the duration of stay of the zinc oxide fume in this chamber. This after-treatment to a large extent rectifies any lattice disturbances which may have arisen during the rapid growth of the lattice in the flame, the stoichiometric proportions of the zinc and oxygen in the zinc oxide are slightly improved, and in addition limited particle growth takes place.

It has been found, surprisingly, that when hydrogen is used as reducing gas, the mean particle size of the zinc of the zinc oxide fume deposited beyond the after-treatment chamber is reduced from about 0.8–1.0 μm. to about 0.05–0.2 μm. simply by increasing the volumetric ratio of oxygen to hydrogen, e.g., from 2 to 20. A similar although less marked reduction in the particle size occurs if the volumetric ratio of oxygen to carbon monoxide is increased when carbon monoxide is used.

The zinc oxide fume can be trapped in known manner in deposition chambers or bags as in bag-type filters. It has been found that clean and quantitative deposition of the zinc oxide fume can be achieved by means of known electrostatic deposition apparatus. The main advantages of such deposition apparatus compared with the usual deposition chambers and sack apparatus, is that the electrostatically deposited zinc oxide has not effect on the flow conditions and durations of dwell of the subsequently produced zinc oxide fume in the flame and hence on the properties of the zinc oxide, such as may otherwise occur, e.g., as a result of increasing constriction in the cross-section or increase in the flow resistance due to zinc oxide deposits. The reason for this is that in electrostatic deposition apparatus, the flow cross-sections may be kept very large since no obstructions are necesary to achieve deposition.

When hydrogen or hydrogen-containing gases are used, electrostatic deposition of the zinc oxide fume must take place above 100° C. because otherwise steam may condense in the deposition apparatus.

To fractionate the zinc oxide fume according to its time of formation, it is advantageous to arrange several deposition chambers with closable inlet apertures in parallel. Fractionation according to particle size can be achieved by arranging several deposition chambers in series. The two systems of fractionation may, of course, be combined and it is possible to fractionate both according to the time of formation and the particle size.

The zinc oxides prepared by the process according to the invention were investigated by various methods for their photoconductivity.

METHOD 1

Visual inspection of the luminescence of the zinc oxide powder

For this purpose, the powder is compressed, e.g., into a cylindrical aperture of about 10 to 20 mm. in diameter in a matt black plate so that the surface of the pressed powder appears smooth. UV light containing only wavelengths ≦380 mm. is then focused onto the sample. At room temperature, photoconductive zinc oxides show a violet blue to bluish yellow luminescence whilst insensitive zinc oxides show a luminous green or greenish yellow luminescence which is due to lack of oxygen in the zinc oxide lattice. Zinc oxide powders which are chemically pure and stoichiometrically perfect and which at the most have only a slight intrinsic disarrangement always manifest the violet blue, so-called edge luminescence. This method does not give any accurate information on the quality of the zinc oxide but can only be used for a rough subdivision into at least two classes of quality.

METHOD 2

Mass spectrometric measurement of oxygen given off from zinc oxide powder irradiated in a high vacuum If a zinc oxide powder is irradiated with predominantly UV light in a high vacuum or a sensitized zinc oxide powder is irradiated with visible light in a high vacuum then a more or less marked oxygen photo-desorption takes place if the irradiation extends over several seconds. If the irradiation times are considerably longer, there takes place in addition to the photo-desorption also a liberation of oxygen due to photolytic decomposition. The oxygen detected by mass spectrometry is a direct measure of the photoconductivity. Depending on the design of the mass spectrometer, the oxygen can be demonstrated either directly as oxygen or indirectly via reaction products of oxygen with residual gas components or components of the vacuum system, e.g., via the reaction $C+O \rightarrow CO$ or $C+\frac{1}{2}O_2 \rightarrow CO$. Experiments have shown that a product which is found to have good photoconductivity by method 1 also manifests good photoconductivity when tested by method 2 and vice-versa. Method 2 is, however, more accurate.

Irradiation with a mercury vapor high pressure lamp (Osram HBO 200 w.) from a distance of 20 cm. is one way to conduct this test.

METHOD 3

Determination of the photocurrent increase of compressed zinc oxide powder when irradiated in vacuo (a) Zinc oxide powder is compressed into cylindrical tablets 10 mm. in diameter and about 2 mm. in thickness. A pressure of one ton per cm.$^2$ is employed. A pair of silver intermeshing comb electrodes is applied to one of the two circular surfaces by evaporation in a high vacuum. Each of the two intermeshing combs has four teeth 0.4 mm. in width and the distance between adjacent teeth is also 0.4 mm. Several tablets are glued onto an insulating plate which is fixed in position in a chamber which is subsequently evacuated to a vacuum of $1.10^{-5}$ mm. Hg. A direct voltage of 10 v. is applied between the electrodes of the comb electrode system. The tablets are exposed to unfiltered light from a mercury vapor high pressure lamp (Osram HBO 200 w.) through a quartz window in the vacuum chamber from a distance of 30 cm. The photocurrent which increases with time in the high vacuum during irradiation, is a measure of the photoconductivity. The steeper the photocurrent curve in the current/time diagram at the reference point of time $t_x$, the greater is the photoconductivity. This method is very accurate and the photosensitivity results obtained agree qualitatively with those obtained by methods 1 and 2.

(b) Instead of the somewhat complicated preparation of tablets with electrodes applied by evaporation, the zinc oxide can also be evaluated in a pressure powder chamber as described in (a). Solid intermeshing silver combs are secured to one side of an insulating plate by means of a second insulated plate screwed onto the first plate and containing a molding aperture at the combs. Zinc oxide powder is pressed into the aperture between the silver combs under a pressure of 0.5 ton/cm.$^2$.

METHOD 4

Determination of the charging height and charging jump during exposure of layers of zinc oxide powder The zinc oxide powder is pressed onto a metal support. The thickness of the layer is about 100 μm., the pressure employed for compression is 5 kg./cm.$^2$. This powder layer is negatively charged in a container of relative humidity below 10% by corona discharge in the dark from a metal tip which is at a voltage of −7000 v. and a distance of 7 cm. while the metal support is grounded. The intensity of charging is determined by means of a mesh-shaped electrostatic induction probe. The powder is then exposed for one second to incandescent lamplight of 400 lux (color temperature 2850° K.), the charge applied being suddenly reduced during this operation to a value which is still finite. Zinc oxide powder which is suitable for electrophotography should be capable of being charged to a high value and manifest a high charging jump on exposure to light. The intensity of charging of electrophotographic layers is a measure of the amount of blackening or coloration that can be achieved in the layer whereas the charge jump is a measure of the photosensitivity.

The process of the invention will now be explained in more detail in the examples given below.

EXAMPLE 1

1 kg. of pure zinc is vaporized within 90 minutes at 860° C. and together with 1.2 Nm.$^3$/h. of hydrogen it is introduced through the aperture 1 of an axially symmetrical combustion chamber which has a tangentially arranged injector 2 for oxygen as indicated in FIGURES 1 and 2, and is transported along the axis of rotation of this chamber. The quantity of oxygen injected was 4 Nm.$^3$/h. The after-treatment chamber had a temperature of 700° C. The electrostatic deposition system consisted of two parallel chambers with throttle flaps at the inlet. The zinc oxide fume produced was deposited in the first chamber until constant conditions of combustion were obtained and the main product was then deposited in the second chamber, the quantity of main product deposited being 942 g., i.e., approximately 75% of the theoretically expected quantity of zinc oxide. Table 1 illustrates the advantageous properties of this product compared with the best product, as regards photosensitivity, hitherto available on the market, namely Photox 801 of the New Jersey Zinc Company, New York, N.Y., U.S.A.

TABLE 1

| | Product of Example 1 | Photox 801 (New Jersey Zinc Co.) |
|---|---|---|
| Mean particle size (electron microscopic) | Approx. 0.7 to 0.9 μm | Approx. 0.8 to 1.0 μm. |
| Luminescence (Method 1) | Blue | Yellow to bluish yellow. |
| Instantaneous liberation of oxygen (Method 2) | After 1 min. UV: 3 relative units. After 30 min. UV: 0.5 relative unit. | After 1 min. UV: 1 relative unit. After 30 min. UV: 0.25 relative unit. |
| Photocurrent increase, average value taken over irradiation time (Method 3a) | At 10 sec. UV: 340 μa./sec. At 60 sec. UV: 200 μa./sec. | At 10 sec. UV: 120 μa./sec. At 60 sec. UV: 110 μa./sec. |
| Maximum charging height charging jump (Method 4) | 1.7 relative units | 1.0 relative unit. |
| Charging jump (Method 4) | 0.7 relative unit | 0.3 relative unit. |

EXAMPLE 2

1 kg. of pure zinc was vaporized at 970° C. within a time of 65 minutes and together with 1.5 Nm.³/h. of hydrogen it was conveyed into a combustion chamber which was equipped with two injectors for oxygen arranged both in the same plane tangentially to the combustion chamber. 8 Nm.³/h. of oxygen were injected through the first injector and 10 Nm.³/h. through the second. The after-treatment chamber was at a temperature of 850° C. The electrostatic deposition system consisted of two parallel chambers equipped with throttle flaps at the inlet and a third chamber which was connected in series with the second chamber. Until constant conditions of combustion were reached, the zinc oxide fume produced was deposited in the first chamber and the main product in the second and third chamber. Since there is no significant difference between the fractions collected in the second and the third chamber except for a slight difference in the particle sizes, these two fractions will be regarded as one product. The yield in these chambers was 911 g., i.e. approximately 73% of the theoretical quantity of zinc oxide to be expected. The properties of this product are compared in Table 2 with a zinc oxide frequently used hitherto in electrophotography. The latter is zinc oxide p.a. (pro analysi) of the firm Merck of Darmstadt, Germany.

TABLE 2

|  | Product of Example 2 | Zinc oxide p.a. (Merck) |
|---|---|---|
| Mean particle size (electronmicroscopic) | Approx. 0.2 to 0.5 $\mu$m | Approx. 0.7 to 0.9 $\mu$m |
| Luminescence (Method 1) | Violet-blue | Brown with some violet |
| Instantaneous delivery of oxygen (Method 2) | After 1 min. UV: 7 relative units. After 30 min. UV: 0.6 relative unit. | After 1 min. UV: 0.9 relative unit After 30 min. UV: 0.6 relative unit. |
| Photocurrent increase, mean value taken over the irradiation time (Method 3a). | At 10 sec. UV: 430 $\mu$a./sec. At 60 sec. UV: 220 $\mu$a./sec. | At 10 sec. UV: 110 $\mu$a./sec. At 60 sec. UV: 110 $\mu$a./sec. |
| Maximum charging height charge jump (Method 4) | 1.4 relative unit | 0.9 relative unit. |
| Charge jump (Method 4) | 0.6 relative unit | 0.25 relative unit. |

If 1.5 Nm.³/h. carbon monoxide is used instead of hydrogen under otherwise the same conditions a zinc oxide of slightly less photosensitivity is obtained.

In detail, the results are as follows—

Mean particle size: approx. 0.3 to 0.6 $\mu$m.
Luminescence (Method 1): brown with some violet
Instantaneous delivery of oxygen (Method 2): after 1 min. UV, 3 relative units; after 30 min. UV, 0.3 relative units
Photocurrent increase (Method 3a): at 10 sec. UV, 250 $\mu$a./sec.; at 60 sec. UV, 140 $\mu$a./sec.
Maximum charging height: 1.2 relative units
Charge jump (Method 4): 0.4 relative units.

What is claimed is:

1. In the process for the production of zinc oxide of high photoconductivity by the combustion of zinc vapor and thermal after-treatment of the zinc oxide fume, the improvement consisting of
    (a) evaporating the zinc,
    (b) transporting the zinc vapor together with a reducing gas essentially consisting of at least one of the gases of the groups consisting of hydrogen and carbon monoxide into an elongated combustion chamber having a longitudinal axis about which it is essentially symmetrical, whereby the zinc vapor together with the reducing gas is transported along the axis of the chamber,
    (c) simultaneously injecting tangentially in stoichiometric excess oxygen into the combusition chamber through at least one inlet, the volume of oxygen being at least twice the volume of the reducing gas and at least twice the volume required for stoichiometric combustion of the reducing gas and zinc, so that the zinc vapor is burned at a temperature of between 1500 and 2000° C. to form zinc oxide within a strongly turbulent flame,
    (d) annealing the zinc oxide fume thus formed at a temperature between 500 and 900° C. in an after-treatment chamber.

2. Process according to claim 1, characterized in that the volume of hydrogen and carbon monoxide required per kilogram of vaporized zinc is 0.2 to 2 Nm.³.

3. Process according to claim 1 in which the combustion chamber has a volume of 100 cc. for the combustion of about 1 kilogram of zinc per hour.

4. A process for producing zinc oxide of high photoconductivity, which process comprises the steps of introducing into one end of an elongated combustion chamber having a longitudinal axis with respect to which it is symmetrical, a stream of the vapors of essentially pure zinc carried in a reducing gas, injecting tangentially into the side of the chamber a stream of oxygen having at least twice the volume of the reducing gas and at least twice the volume required for stoichiometric combustion of the reducing gas and zinc, to form a vortex within the wall of the chamber and burn the zinc within the vortex and away from the wall, cooling the combustion products and during the cooling annealing the zinc oxide in the combustion products.

References Cited

UNITED STATES PATENTS

| 1,372,486 | 3/1921 | Coursen | 23—148 |
| 1,522,097 | 1/1925 | Breyer et al. | 23—148 |
| 1,566,103 | 12/1925 | Kirk | 23—148 XR |
| 1,628,952 | 5/1927 | Cregan | 23—148 |
| 1,940,125 | 12/1933 | Handwerk et al. | 23—148 |
| 2,036,566 | 4/1936 | Bunce et al. | 23—148 |
| 2,053,249 | 9/1936 | Reinhard | 23—148 |
| 2,139,196 | 12/1938 | Maidens | 23—148 |
| 2,331,599 | 10/1943 | Cyr | 23—148 |

OSCAR R. VERTIZ, Primary Examiner

HOKE S. MILLER, Assistant Examiner

U.S. Cl. X.R.

23—277